US 6,619,960 B1

(12) United States Patent
Horn

(10) Patent No.: US 6,619,960 B1
(45) Date of Patent: Sep. 16, 2003

(54) LINEAR CONTROL LOADING SYSTEM

(75) Inventor: David Horn, Tulsa, OK (US)

(73) Assignee: Aviation Simulation Trainers, Inc., Lenexa, KS (US)

(*) Notice: Subject to any disclaimer, the term of this patent is extended or adjusted under 35 U.S.C. 154(b) by 0 days.

(21) Appl. No.: 10/068,186

(22) Filed: Feb. 5, 2002

Related U.S. Application Data

(60) Provisional application No. 60/266,843, filed on Feb. 6, 2001.

(51) Int. Cl.[7] .................................................. G09B 9/10
(52) U.S. Cl. ............................ 434/37; 434/45; 434/55; 472/130
(58) Field of Search ............................. 434/29, 37, 46, 434/54, 55, 59; 472/59, 60, 130; 244/1 R, 75 R, 76 R, 223

(56) References Cited

U.S. PATENT DOCUMENTS

| | | | | |
|---|---|---|---|---|
| 2,851,795 A | * | 9/1958 | Sherman | 434/45 |
| 3,699,369 A | * | 10/1972 | Hlipala et al. | 310/106 |
| 3,805,413 A | * | 4/1974 | Burny et al. | 434/45 |
| 5,209,661 A | * | 5/1993 | Hildreth et al. | 434/45 |
| 5,286,203 A | * | 2/1994 | Fuller et al. | 434/45 |
| 5,587,937 A | * | 12/1996 | Massie et al. | 703/7 |
| 5,634,794 A | * | 6/1997 | Hildreth et al. | 434/37 |
| 6,027,342 A | * | 2/2000 | Brown | 434/55 |
| 6,269,733 B1 | * | 8/2001 | Reust | 91/415 |

* cited by examiner

Primary Examiner—Kien T. Nguyen
(74) Attorney, Agent, or Firm—Hovey Williams LLP

(57) ABSTRACT

A flight simulator control loading system (10A) comprises a compression assembly (18a), a tension assembly (18b), and a motor (30) which rotates a shaft (78). The compression assembly (18a) and the tension assembly (18b) each include a fixed actuator (50a,50b) fixedly secured to an outer housing (46a,46b), and an adjustable actuator (52a,52b) slidably mounted within a guide housing (48a,48b). Springs (54a, 54b,56a,56b) are located between and push against the actuators (50a,50b,52a,52b). As the shaft (78) is rotated in an increase direction, each adjustable actuator (52a,52b) slides toward the respective fixed actuator (50a,50b), compressing the springs (54a,54b,56a,56b) and increasing control load. As the shaft (78) is rotated in a decrease direction, each adjustable actuator (52a,52b) slides away from the respective fixed actuator (50a,50b), relieving compression on the springs (54a,54b,56a,56b) and decreasing control load.

9 Claims, 5 Drawing Sheets

LINEAR CONTROL LOADING SYSTEM

RELATED APPLICATIONS

This application claims priority of a provisional patent application titled "Linear Control Loading System", Ser. No. 60/266,843 filed Feb. 6, 2001, hereby incorporated into the present application by reference.

BACKGROUND OF THE INVENTION

1. Field of the Invention

The present invention relates to flight simulators and flight simulator controls. More particularly, the present invention relates to a linear flight simulator control loading system that linearly adjusts a control load to more realistically simulate an aircraft in flight.

2. Description of Prior Art

Many aircraft use mechanical linkages to connect a control to one or more control surfaces. The control may be a yoke or rudder pedals and allow a pilot to manipulate the control surfaces, such as, ailerons, elevators, and rudders. An aileron is typically mounted on a wing of an aircraft and is used to control roll of the aircraft. An elevator is typically mounted on a tail section of an aircraft and is used to control pitch of the aircraft. A rudder is typically mounted on a tail section of an aircraft and is used to control yaw of the aircraft.

These control surfaces function by deflecting airflowing past them. For instance, as air flows past a wing, an aileron can be rotated such that it deflects the air upward, therefore pushing the wing down. As the wing is pushed down, the aircraft rolls toward that wing.

Air flows past a control surface of an aircraft at a rate determined by, among other things, airspeed of the aircraft. As the aircraft moves faster, relative to the air it is moving through, the air flows past the control surface at a faster rate.

A common flight characteristic is, as air flows past a control surface at a faster rate, more force is required to manipulate the control surface. This force is typically referred to as control load. At a relatively low airspeed, a control surface requires relatively little force to rotate it to a fully deflected position. At a relatively high airspeed, the control surface requires greater force to rotate it to the fully deflected position.

This flight characteristic has proven difficult to efficiently, and realistically simulate, as part of a flight simulator. Current systems fall into one of two categories, complicated and sophisticated high cost systems and less sophisticated low cost systems.

High cost systems typically use hydraulics with a closed loop control scheme to simulate control load forces. These systems are complex, typically have many moving parts, and are subject to high maintenance requirements. Complexity, cost, and maintenance requirements prevent these systems from being used in all but the most expensive flight simulators.

Low cost systems typically use friction or simple springs to simulate control load forces. These systems are simple but not realistic. These systems typically have no way to adjust the force according to airspeed or other factors. Since they cannot realistically simulate control load, these systems can only be used in very rudimentary flight simulators.

Accordingly, there is a need for an improved flight simulator control loading system that overcomes the limitations of the prior art.

SUMMARY OF THE INVENTION

The linear flight simulator control loading system of the present invention overcomes the above-identified problems and provides a distinct advance in the art of flight simulator control loading systems. More particularly the present invention provides a linear flight simulator control loading system for use in a flight simulator that linearly adjusts a control load to more realistically simulate an aircraft in flight with a relatively inexpensive and simple construction that may be used in flight simulators of any cost.

The flight simulator typically includes a computer that interacts with a pilot and other components of the flight simulator. The pilot manipulates one or more controls, such as, a yoke and rudder pedals. The computer monitors the control position and commands the flight simulator in order to interpret the pilot's actions and accurately simulate flight.

The preferred flight simulator control loading system broadly comprises a gearbox housing, a compression assembly, a tension assembly, and a shaft running through the assemblies and the gearbox housing. The gearbox housing includes a motor operable to rotate the shaft via a worm gear.

The compression assembly is connected to a control manipulated by a pilot and includes an outer housing, a guide housing, a fixed force actuator, an adjustable force actuator, a first spring, and a second spring. The outer housing slides along the guide housing which is fixedly secured to the gearbox housing. The force actuator is fixedly secured to the outer housing near a distal end. The adjustable actuator is slidably mounted within the guide housing near a proximal end. The adjustable actuator is allowed to slide but not rotate within the guide housing. The two springs are located between and push against the two actuators.

The tension assembly is typically connected to a trim system. The trim system is another component of the flight simulator that simulates another flight characteristic. The tension assembly is similar to the compression assembly and also includes an outer housing, a guide housing, a fixed force actuator, an adjustable force actuator, a first spring, and a second spring. The outer housing slides along the guide housing which is fixedly secured to the gearbox housing. The fixed actuator is fixedly secured to the outer housing near a proximal end. The adjustable actuator is slidably mounted within the guide housing near a distal end. The adjustable actuator is allowed to slide but not rotate within the guide housing. The two springs are located between and push against the two actuators.

The shaft runs through the springs and the actuators. The shaft is rotatably secured to each fixed actuator and threaded within each adjustable actuator. As the shaft is rotated in an increase direction, each adjustable actuator slides toward the respective fixed actuator, thereby compressing the springs and increasing control load. As the shaft is rotated in a decrease direction, each adjustable actuator slides away from the respective fixed actuator, thereby relieving compression on the springs and decreasing control load. The increase direction and the decrease direction are determined by the threads on the shaft and each adjustable actuator.

In use, the computer monitors factors such as airspeed and orientation of the aircraft being simulated and determines an appropriate control load level. When the computer determines that control load should be increased it causes the motor to rotate the shaft in the increase direction, thereby compressing the springs and increasing the force needed to move the control. Alternatively, when the computer determines that control load should be decreased it causes the motor to rotate the shaft in the decrease direction, thereby relieving compression on the springs and decreasing the force needed to move the control. As a pilot manipulates the control, he or she experiences more or less control load, just as in a real aircraft.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
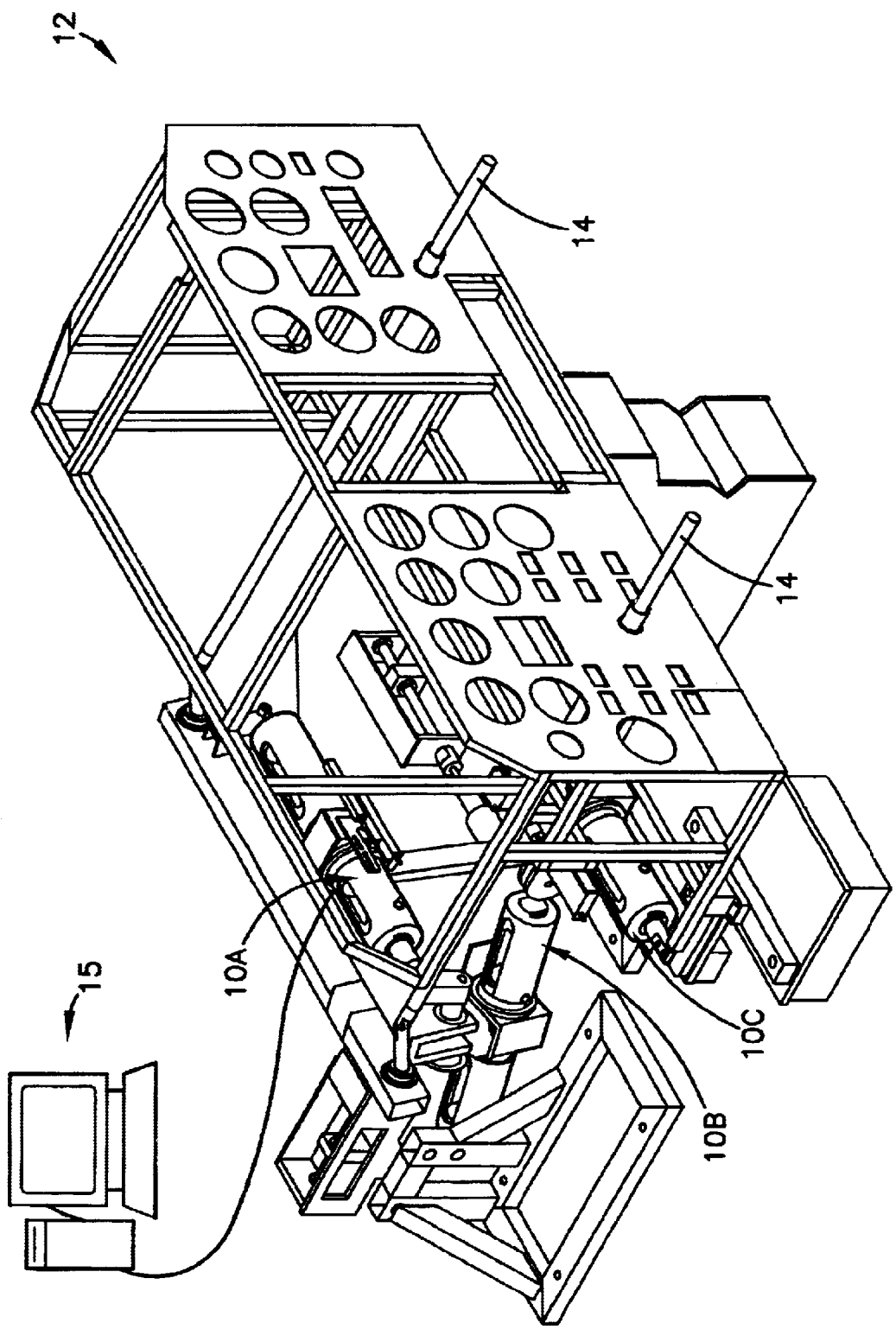
FIG. 1 is a perspective view of several flight simulator control loading systems constructed in accordance with a preferred embodiment of the present invention and shown as part of a flight simulator.

FIG. 1 illustrates several linear flight simulator control loading systems 10A, 10B, 10C in accordance with a preferred embodiment of the present invention and shown in the preferred environment of use as part of a flight simulator 12. The simulator 12 is operable to simulate several flight characteristics of one or more aircraft in order to allow a pilot to practice flying the aircraft. The simulator includes one or more controls 14 such as a yoke and rudder pedals that allow the pilot to interact with a computer 15, and the loading systems 10A, 10B, 10C.

The computer 15 monitors each control's 14 position and commands the flight simulator 12 in order to interpret the pilot's actions and accurately simulate flight. The computer 15 is capable of storing and executing software and may be a commonly available personal computer, such as those available from Compaq Corporation or may be a microcomputer, such as those available from International Business Machines. Based upon the pilot manipulating each control 14 and simulated conditions, such as, weather and/or aircraft failures, the software decides how the aircraft will behave. This behavior is presented to the pilot through visual and other indications, such as control load.

Figure 2:
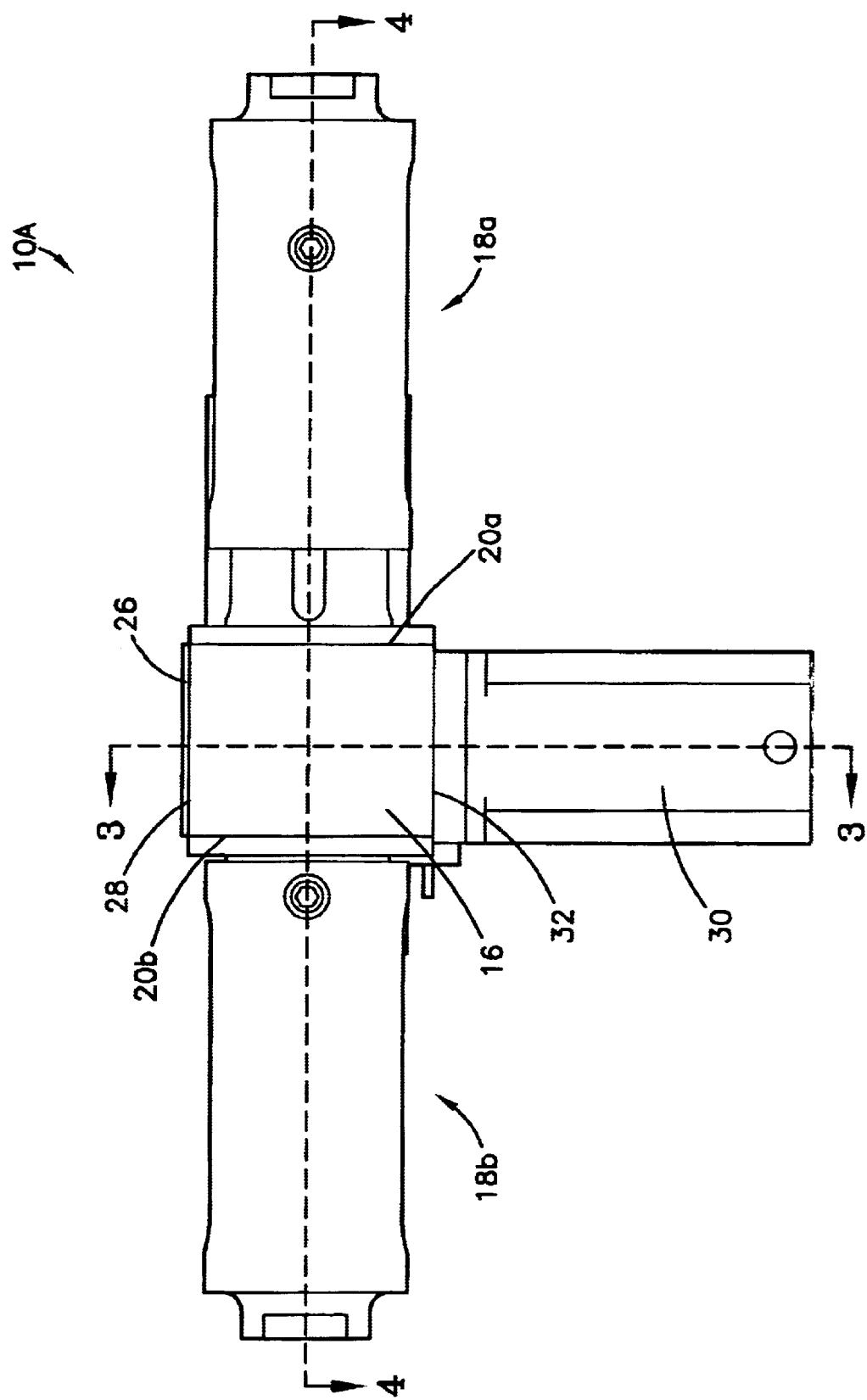
FIG. 2 is an elevation view of one of the control loading systems.

FIG. 2 illustrates one of the loading systems 10A in more detail. The other loading systems 10B, 10C are substantially identical to the loading system 10A. The loading system 10A broadly comprises a gearbox housing 16, a compression assembly 18a mounted to a compression side 20a of the gearbox housing 16, and a tension assembly 18b mounted to a tension side 20b of the gearbox housing 16. The gearbox housing 16 is preferably milled from an approximately two and one quarter inches thick, approximately three inches wide, and approximately three inches tall block of aluminum. The gearbox housing 16 includes an access cover 26 secured to an access side 28. The access cover 26 is preferably constructed of one sixteenth of an inch thick aluminum and is approximately two and one quarter inches wide and approximately three and one half inches tall.

Figure 3:
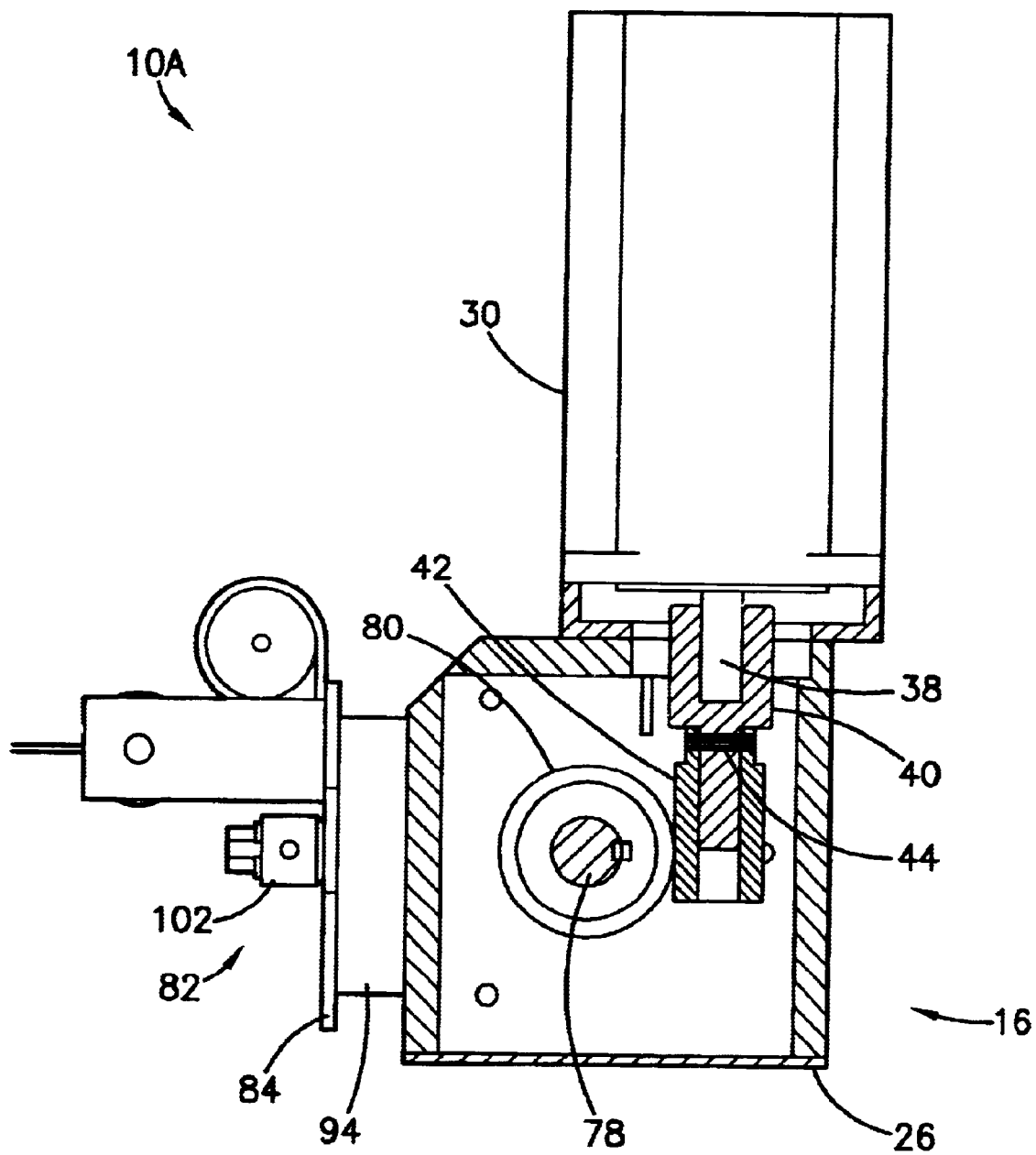
FIG. 3 is a sectional view of the control loading system taken along line 3—3 of FIG. 2.

A motor 30 is secured to a motor side 32 of the gearbox housing 16. Referring also to FIG. 3, the motor 30 includes a spindle 38, a spindle extension 40, and a pinion gear 42.

The spindle extension 40 is preferably pressed onto the spindle 38. The pinion gear 42 is secured to the spindle extension by a spring pin 44. The motor 30 is preferably operated on twelve volts.

Figure 4:
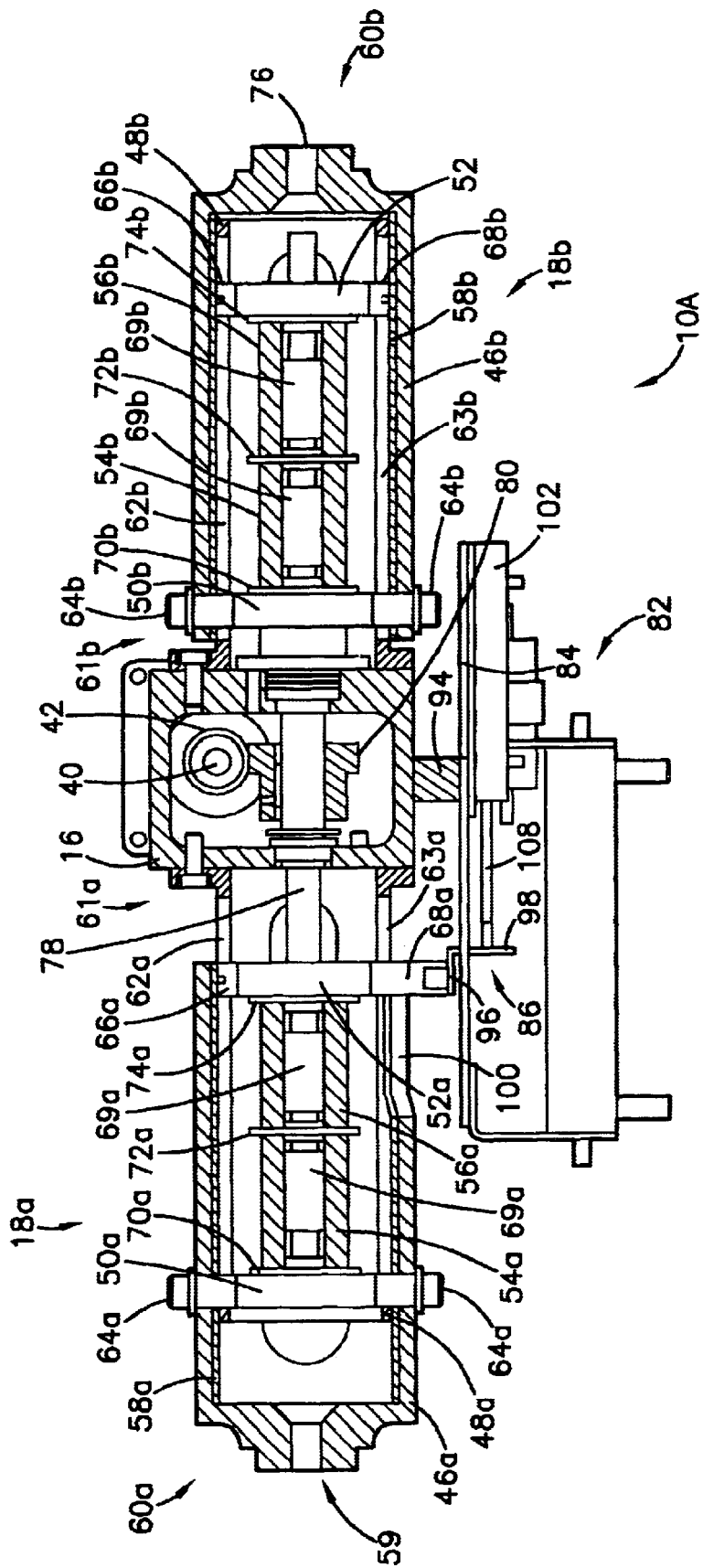
FIG. 4 is a sectional view of the control loading system taken along line 4—4 of FIG. 2.

Referring also to FIG. 4, the compression assembly 18a includes an outer housing 46a, a guide housing 48a, a fixed force actuator 50a, an adjustable force actuator 52a, a first spring 54a, and a second spring 56a. The outer housing 46a is approximately five and three quarter inches long with an approximately two and one half inch exterior diameter. The outer housing 46a is preferably constructed of aluminum with an approximately three sixteenths of an inch wall thickness. The outer housing 46a includes an interior sleeve 58a and a control connection 59 at a distal end 60a. The sleeve 58a is preferably constructed of approximately one sixteenth of an inch thick nylon and allows the outer housing 46a to easily slide along the guide housing 48a.

The guide housing 48a is approximately five and one quarter inches long with an approximately two inch exterior diameter. The guide housing 48a is preferably constructed of aluminum with an approximately one eighth of an inch wall thickness. At a proximal end 61a, the guide housing 48a is fixedly secured to the gearbox housing 16. The guide housing 48a includes a top slot 62a and a bottom slot 63a which are each approximately four and three quarter inches long.

The fixed force actuator 50a is fixedly secured to the outer housing 46a near the distal end 60a by two bolts 64a through the slots 62a,63a. The fixed force actuator 50a is approximately one and five eighths inches in diameter and preferably constructed of approximately three eighths of an inch thick aluminum.

The adjustable force actuator 52a is slidably secured within the guide housing 48a near the proximal end 61 a by a top stud 66a and a bottom stud 68a. The adjustable force actuator 52a is approximately one and five eighths inches in diameter and preferably constructed of approximately three eighths of an inch thick brass. The studs 66a,68a slide within the slots 62a,63a allowing the adjustable force actuator 52a to slide but not rotate within the guide housing 48a.

The two springs 54a,56a are located between and push against the two actuators 50a,52a. Each spring 54a,56a is preferably constructed from urethane with an approximately five eighths of an inch interior diameter and an approximately one inch exterior diameter.

Inside each spring 54a,56a is a stop 69a. Each stop 69a prevents the springs 54a,56a from being over-compressed. Each stop 69a is approximately one inch long with an approximately one half inch interior diameter and preferably constructed of brass with an approximately one sixteenth of an inch wall thickness.

Additionally, the compression assembly 18a includes a first separator 70a, a second separator 72a, and a third separator 74a. The first separator 70a is located between the fixed force actuator 50a and the first spring 54a. The second separator 72a is located between the first spring 54a and the second spring 56a. The third separator 74a is located between the second spring 56a and the adjustable force actuator 52a. Each separator 70a,72a,74a is approximately one and one quarter inches in diameter and preferably constructed of approximately one sixteenth of an inch thick aluminum.

The tension assembly 18b is similar to the compression assembly 18 and also includes an outer housing 46b, a guide housing 48b, a fixed force actuator 50b, an adjustable force actuator 52b, a first spring 54b, and a second spring 56b. The outer housing 46b is approximately five and three quarter inches long with an approximately two and one half inch exterior diameter. The outer housing 46b is preferably constructed of aluminum with an approximately three sixteenths of an inch wall thickness. The outer housing 46b includes an interior sleeve 58b and a trim connection 76 at a distal end 60b. The sleeve 58b is preferably constructed of approximately one sixteenth of an inch thick nylon and allows the outer housing 46b to easily slide along the guide housing 48b.

The guide housing 48b is approximately five and one quarter inches long with an approximately two inch exterior diameter. The guide housing 48b is preferably constructed of aluminum with an approximately one eighth of an inch wall thickness. At a proximal end 61b, the guide housing 48b is fixedly secured to the gearbox housing 16. The guide housing 48b includes a top slot 62b and a bottom slot 63b which are each approximately four and three quarter inches long.

The fixed force actuator 50b is fixedly secured to the outer housing 46b near the proximal end 61b by two bolts 64b through the slots 62b,63b. The fixed force actuator 50b is approximately one and five eighths inches in diameter and preferably constructed of approximately three eighths of an inch thick aluminum.

The adjustable force actuator 52b is slidably secured within the guide housing 48b near the distal end 60b by a top stud 66b and a bottom stud 68b. The adjustable force actuator 52b is approximately one and five eighths inches in diameter and preferably constructed of approximately three eighths of an inch thick brass. The studs 66b,68b slide within the slots 62b,63b allowing the adjustable force actuator 52b to slide but not rotate within the guide housing 48b.

The two springs 54b,56b are located between and push against the two actuators 50b,52b. Each spring 54b,56b is preferably constructed from urethane with an approximately five eighths of an inch interior diameter and an approximately one inch exterior diameter. The preferred springs 54a,54b,56a,56b are currently available from Associated Spring Raymond of Barnes Group, Inc., part number P0500-60A-1500.

Inside each spring 54b,56b is a stop 69b. Each stop 69b prevents the springs from being over-compressed. Each stop 69b is approximately one inch long with an approximately one half inch exterior diameter and preferably constructed of brass with an approximately one sixteenth of an inch wall thickness.

Additionally, the tension assembly 18b includes a first separator 70b, a second separator 72b, and a third separator 74b. The first separator 70b is located between the fixed force actuator 50b and the first spring 54b. The second separator 72b is located between the first spring 54b and the second spring 56b. The third separator 74b is located between the second spring 56b and the adjustable force actuator 52b. Each separator 70b,72b,74b is approximately one and one quarter inches in diameter and preferably constructed of approximately one sixteenth of an inch thick aluminum.

As can be seen from the descriptions above, the compression assembly 18a and the tension assembly 18b are nearly identical. One significant difference is orientation of the housings 46a,46b,48a,48b. The outer housings 46a,46b and the guide housings 48a,48b are substantially mirrored, while the remaining components retain substantially the same orientation.

Another significant difference is how the assemblies 18a, 18b operate. The compression assembly 18a is designed to resist compression forces. At rest, there is an approximately one inch gap between proximal ends of the outer housing 46a and the guide housing 48a. As the pilot pushes on the control 14, the springs 54a,56a are compressed. The springs 54a,56a resist the pilot's force, while the proximal ends converge, thus simulating control load.

Conversely, the tension assembly 18b is designed to resist tension forces. At rest, proximal ends of the outer housing 46b and the guide housing 48b are nearly in contact. As the pilot pulls on the control 14, the springs 54b,56b are compressed. The springs 54b,56b resist the pilot's force, while the proximal ends diverge, thus simulating control load.

A shaft 78 runs through the actuators 50a,50b,52a,52b, the stops 69a,69b, and the separators 70a,70b,72a,72b,74a, 74b. The shaft 78 is approximately three eighths of an inch in diameter along most of its approximately twelve and one quarter inch length. The shaft 78 is preferably constructed of steel. The shaft 78 is rotatably secured to each fixed force actuator 50a,50b and threaded within each adjustable force actuator 52a,52b.

A worm gear 80 is secured near the middle of the shaft 78. The worm gear 80 meshes with the pinion gear 42 of the motor 30, allowing the motor 30 to rotate the shaft 78. As the shaft 78 is rotated in an increase direction, each adjustable force actuator 52a,52b slides toward the respective fixed force actuator 50a,50b, thereby compressing the springs 54a,54b,56a,56b and increasing control load. As the shaft 78 is rotated in a decrease direction, each adjustable force actuator 52a,52b slides away from the respective fixed force actuator 50a,50b, thereby relieving compression on the springs 54a,54b,56a,56b and decreasing control load.

Figure 5:
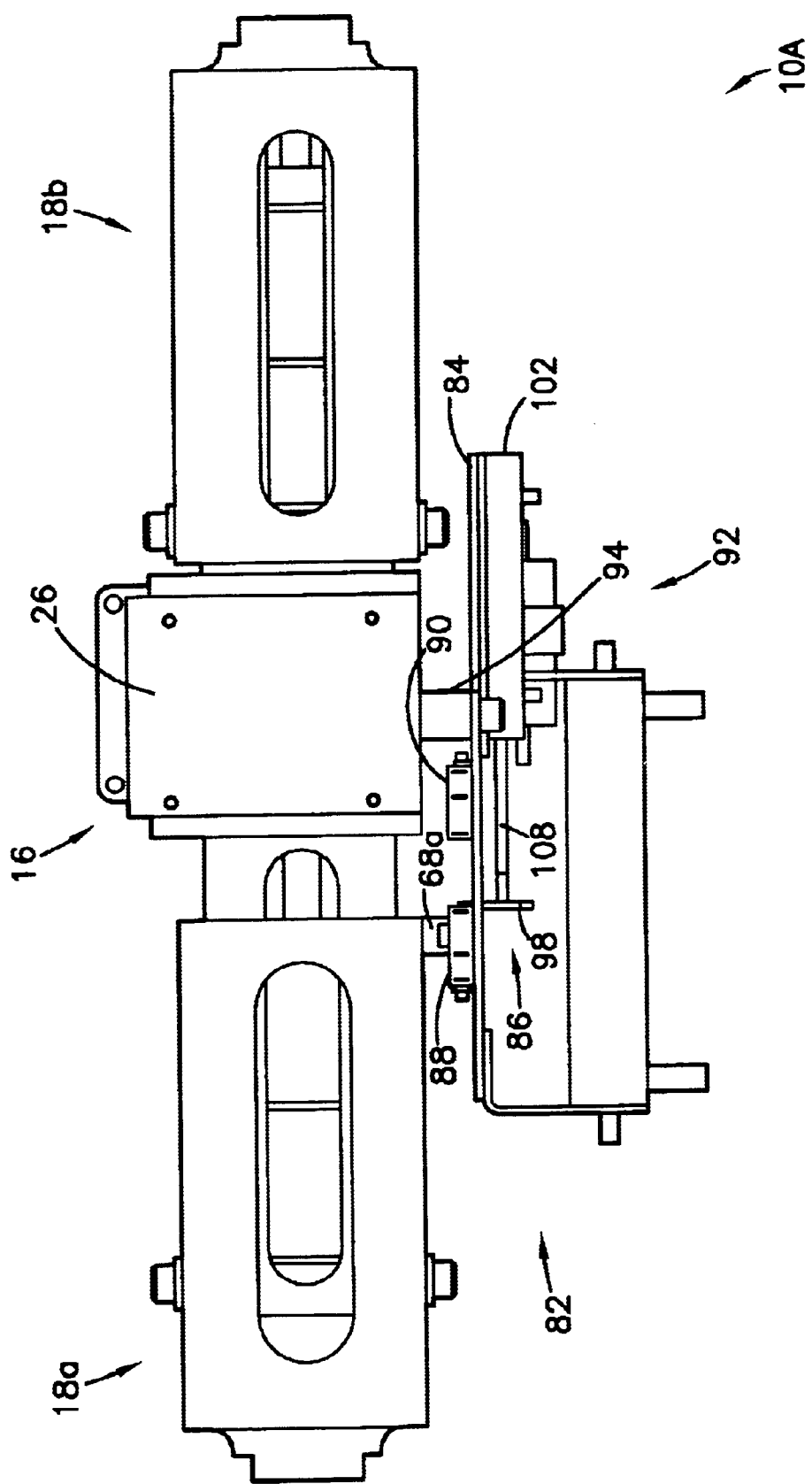
FIG. 5 is a plan view of the control loading system of FIG. 2.

Referring also to FIG. 5, the loading system 10a also includes a load detection assembly 82. The detection assembly 82 includes a detection bracket 84, an angle bracket 86, an increase limit switch 88, a decrease limit switch 90, and a load detection circuit 92. The detection bracket 84 is mounted to the gearbox housing 16 by a spacer 94. The detection bracket 84 is preferably constructed of approximately one eighth of an inch thick aluminum. The detection bracket 84 secures the rest of the detection assembly 82 to the gearbox housing 16.

The angle bracket 86 includes a short flange 96 and a long flange 98 and is preferably constructed of approximately one sixteenth of an inch thick aluminum. The short flange 96 is approximately one half inch long. The long flange 98 is approximately three quarter inches long.

The short flange 96 is secured to the bottom stud 68a of the adjustable force actuator 52a of the compression assembly 18a. The bottom stud 68a of the compression assembly 18a extends through a cutout 100 in the outer housing 46a of the compression assembly 18a, as shown in FIG. 4.

The increase limit switch 88 is positioned on the detection bracket 84 so that the bottom stud 68 will actuate the increase limit switch 88 when the adjustable force actuator 52a has reached a maximum safe increase travel. At this point, the springs 54a,54b,56a,56b are compressed to the maximum and any further rotation of the shaft 78 may result in damage to the loading system 10A. This point is adjustable by repositioning the increase limit switch 88.

The decrease limit switch 90 is positioned on the detection bracket 84 so that the bottom stud 68 will actuate the decrease limit switch 90 when the adjustable force actuator 52a has reached a maximum safe decrease travel. At this point, the springs 54a,54b,56a,56b are compressed to the minimum and any further rotation of the shaft 78 may result in damage to the loading system 10A. This point is also adjustable by repositioning the decrease limit switch 90.

The detection circuit 92 comprises a potentiometer. An arm 108 of the potentiometer 102 is secured to the long flange 98 of the angle bracket 86 and adjusts the resistance of the potentiometer 102 as the adjustable force actuator 52a moves. This allows the detection circuit 92 to detect the adjustable force actuator's 52a position, relative to the gearbox housing 16, by changing a load signal from the detection circuit 92.

It can be seen, that the adjustable force actuators 52a,52b move together. Therefore, detecting the position of one adjustable force actuator 52a inherently gives the position of both adjustable force actuators 52a,52b.

It can also be seen, that the springs 54a,54b,56a,56b are compressed in a linear manner. This results in more realistic simulation by providing a linear relationship between control loads at different control positions, with a given adjustable force actuator 52a,52b position. For instance, with the shaft 78 at rest, pushing the control 14 one quarter inch requires a specific amount of force. Pushing the control 14 one half inch requires approximately twice the specific amount of force.

In use, when the computer 15, running the software, determines that control load should be increased, due to airspeed or other factors, it energizes the motor 30. The motor 30 rotates the shaft 78 in the increase direction via the pinion gear 42 and the worm gear 80. The adjustable force actuators 52a,52b are slid toward the fixed forced actuators 50a,50b via the threaded connection with the shaft 78. The springs 54a,54b,56a,56b compress and thereby increase the force needed to move the control 14.

The computer 15 monitors the adjustable force actuator's 52a position via the detection circuit 92 and can therefore easily, accurately, and reliably achieve any desired control load. As a safety feature, when the increase limit switch 88 is actuated, power is interrupted to the motor 30 stopping the shaft 78. This prevents over-compressing the springs 54a, 54b,56a,56b or damaging the loading system 10A.

Alternatively, when the computer 15, running the software, determines that control load should be decreased, due to airspeed or other factors, it energizes the motor 30. The motor 30 rotates the shaft 78 in the decrease direction via the pinion gear 42 and the worm gear 80. The adjustable force actuators 52a,52b are slid away from the fixed forced actuators 50a,50b via the threaded connection with the shaft 78. The springs 54a,54b,56a,56b expand and thereby decrease the force needed to move a control 14.

The computer 15 again monitors the adjustable force actuator's 52a position via the detection circuit 92. As a safety feature, when the decrease limit switch 90 is actuated, power is interrupted to the motor 30 stopping the shaft 78. This also prevents damaging the loading system 10A.

It can be seen that while the control load is increased or decreased, the outer housings 46a,46b do not move, thereby not moving the control 14. Additionally, the distance the pilot is able to move the control 14 does not change.

While the preferred embodiment of the present invention has been described above, it is understood that other materials and/or dimensions can be substituted, as a matter of design choice. These and other minor modifications are within the scope of the present invention.

Having thus described a preferred embodiment of the invention, what is claimed as new and desired to be protected by Letters Patent includes the following:

1. A flight simulator control loading system for use in a flight simulator, the loading system comprising:

a compression assembly operable to provide resistance to compression forces;

a tension assembly operable to provide resistance to tension forces;

a shaft running between the assemblies;

a motor operable to actuate the shaft and thereby change the resistance to compression forces and the resistance tension forces; and wherein the compression assembly includes a fixed actuator, an adjustable actuator, two springs between and pushing against the actuators, and a separator at each end of each spring.

2. A flight simulator control loading system for use in a flight simulator, the loading system comprising:

a compression assembly operable to provide resistance to compression forces and including a fixed actuator and an adjustable actuator;

a tension assembly operable to provide resistance to tension forces:

a shaft running between the assemblies;

a motor operable to actuate the shaft and thereby change the resistance to compression forces and the resistance tension forces; and wherein the shaft is rotatably secured to the fixed actuator and threaded through the adjustable actuator.

3. A flight simulator control loading system for use in a flight simulator, the loading system comprising:

a compression assembly operable to provide resistance to compression forces;

a tension assembly operable to provide resistance to tension forces;

a shaft running between the assemblies;

a motor operable to actuate the shaft and thereby change the resistance to compression forces and the resistance tension forces; and wherein the tension assembly includes a fixed actuator, an adjustable actuator, two springs between and pushing against the actuators, and a separator at each end of each spring.

4. A flight simulator control loading system for use in a flight simulator, the load system comprising:

a compression assembly operable to provide resistance to compression forces;

a tension assembly operable to provide resistance to tension forces and including a fixed actuator and an adjustable actuator;

a shaft running between the assemblies;

a motor operable to actuate the shaft and thereby change the resistance to compression forces and the resistance tension forces; and wherein the shaft is rotatably secured to the fixed actuator and threaded through the adjustable actuator.

5. A flight simulator control loading system for use in a flight simulator, the loading system comprising:

a compression assembly operable to provide resistance to compression forces;

a tension assembly operable to provide resistance to tension forces;

a shaft running between the assemblies:

a motor operable to actuate the shaft and thereby change the resistance to compression forces and the resistance tension forces; and wherein the motor rotates the shaft via a worm gear.

6. A flight simulator control loading system for use in a flight simulator, the loading system comprising:
- a compression assembly operable to provide resistance to compression forces, the compression assembly including,
  - a fixed actuator,
  - an adjustable actuator, and
  - two springs between and pushing against the actuators, and
  - a separator at each end of each spring;
- a tension assembly operable to provide resistance to tension forces, the tension assembly including,
  - fixed actuator,
  - an adjustable actuator, and
  - at least one spring between and pushing against the actuators;
- a shaft running between the assemblies;
- a motor operable to rotate the shaft via a worm gear and thereby change the resistance to compression forces and the resistance to tension forces; and
- a load detection assembly operable to monitor the loading system operation.

7. A flight simulator control loading system for use in a flight simulator, the loading system comprising:
- a compression assembly operable to provide resistance to compression forces, the compression assembly including,
  - a fixed actuator,
  - an adjustable actuator, and
  - at least one spring between and pushing against the actuators;
- a tension assembly operable to provide resistance to tension forces, the tension assembly including,
  - a fixed actuator,
  - an adjustable actuator, and
  - at least one spring between and pushing against the actuators;
- a shaft running between the assemblies and rotatably secured to each fixed actuator and threaded through each adjustable actuator;
- a motor operable to rotate the shaft via a worm gear and thereby change the resistance to compression forces and the resistance to tension forces; and
- a load detection assembly operable to monitor the loading system operation.

8. A flight simulator control loading system for use in a flight simulator, the loading system comprising:
- a compression assembly operable to provide resistance to compression forces, the compression assembly including,
  - a fixed actuator,
  - an adjustable actuator, and
  - two springs between and pushing against the actuators, and
  - a separator at each end of each spring,
- a tension assembly operable to provide resistance to tension forces, the tension assembly including,
  - a fixed actuator,
  - an adjustable actuator, and
  - at least one spring between and pushing against the actuators;
- a shaft running between the assemblies;
- a motor operable to rotate the shaft via a worm gear and thereby change the resistance to compression forces and the resistance to tension forces; and
- a load detection assembly operable to monitor the loading system operation.

9. A flight simulator control loading system for use in a flight simulator, the loading system comprising:
- a compression assembly operable to provide resistance to compression forces, the compression assembly including,
  - a fixed actuator,
  - an adjustable actuator,
  - two springs between and pushing against the actuators, and
  - a separator at each end of each spring;
- a tension assembly operable to provide resistance to tension forces, the tension assembly including,
  - a fixed actuator,
  - an adjustable actuator,
  - two springs between and pushing against the actuators, and
  - a separator at each end of each spring;
- a shaft running between the assemblies, wherein the shaft is rotatably secured to each fixed actuator and threaded through each adjustable actuator;
- a motor operable to rotate to the shaft via a worm gear and thereby change the resistance to compression forces and the resistance to tension forces; and
- a load detection assembly including,
  - a potentiometer operable to assist monitoring the loading system operation, and
  - two position limit switches operable to detect when the loading system has reached safety limits.

\* \* \* \* \*